(12) United States Patent
Thompson et al.

(10) Patent No.: US 12,126,939 B2
(45) Date of Patent: *Oct. 22, 2024

(54) EVENT RECOGNITION SYSTEMS AND METHODS

(71) Applicant: JBT AeroTech Corporation, Chicago, IL (US)

(72) Inventors: Mark T. Thompson, League City, TX (US); Stephen C. Tatton, Spring, TX (US)

(73) Assignee: JBT AeroTech Corporation, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/371,129

(22) Filed: Sep. 21, 2023

(65) Prior Publication Data

US 2024/0015266 A1 Jan. 11, 2024

Related U.S. Application Data

(63) Continuation of application No. 17/530,572, filed on Nov. 19, 2021, now Pat. No. 11,800,064, which is a
(Continued)

(51) Int. Cl.
*H04N 7/18* (2006.01)
*G06T 7/20* (2017.01)
(Continued)

(52) U.S. Cl.
CPC ............... *H04N 7/181* (2013.01); *G06T 7/20* (2013.01); *G06T 7/70* (2017.01); *G06V 20/41* (2022.01);
(Continued)

(58) Field of Classification Search
CPC .... H04N 7/181; H04N 21/4316; H04N 21/47; H04N 23/54; H04N 23/66; H04N 23/90;
(Continued)

(56) References Cited

U.S. PATENT DOCUMENTS

| | | | | |
|---|---|---|---|---|
| 5,226,204 A | * | 7/1993 | Schoenberger | ......... E01D 15/24 14/71.5 |
| 11,182,610 B2 | * | 11/2021 | Thompson | .............. H04N 23/61 |

(Continued)

*Primary Examiner* — Sath V Perungavoor
*Assistant Examiner* — Tyler B Edwards
(74) *Attorney, Agent, or Firm* — Foley & Lardner LLP

(57) ABSTRACT

An event recognition system includes one or more processing circuits including one or more memory devices and one or more processors. The one or more memory devices are configured to store instructions thereon that, when executed by the one or more processors, cause the one or more processors to: execute an algorithm that receives image data as an input and recognizes a first equipment object and a second equipment object in the image data; recognize an event involving the first equipment object and the second equipment object based upon the image data containing the recognized first equipment object and the recognized second equipment object; and execute an event procedure based upon the event where the event procedure includes controlling the first equipment object.

20 Claims, 5 Drawing Sheets

Related U.S. Application Data continuation of application No. 16/590,171, filed on Oct. 1, 2019, now Pat. No. 11,182,610.

(60) Provisional application No. 62/739,707, filed on Oct. 1, 2018, provisional application No. 62/739,709, filed on Oct. 1, 2018.

(51) Int. Cl.
| | |
|---|---|
| *G06T 7/70* | (2017.01) |
| *G06V 20/40* | (2022.01) |
| *H04N 21/431* | (2011.01) |
| *H04N 21/47* | (2011.01) |
| *H04N 23/54* | (2023.01) |
| *H04N 23/66* | (2023.01) |
| *H04N 23/90* | (2023.01) |
| *B64F 1/305* | (2006.01) |
| *G05D 1/00* | (2006.01) |
| *H04L 67/01* | (2022.01) |

(52) U.S. Cl.
CPC ......... *H04N 21/4316* (2013.01); *H04N 21/47* (2013.01); *H04N 23/54* (2023.01); *H04N 23/66* (2023.01); *H04N 23/90* (2023.01); *B64F 1/305* (2013.01); *G05D 1/101* (2013.01); *G06V 20/44* (2022.01); *H04L 67/01* (2022.05)

(58) Field of Classification Search
CPC ........ H04N 23/61; H04N 23/661; G06T 7/20; G06T 7/70; G06V 20/41; G06V 20/44; B64F 1/305; G05D 1/101; H04L 67/01
See application file for complete search history.

(56) References Cited

U.S. PATENT DOCUMENTS 11,800,064 B2 * 10/2023 Thompson ......... H04N 21/4316
2006/0288503 A1 * 12/2006 Hutton .................. B64F 1/305
14/71.5

* cited by examiner

EVENT RECOGNITION SYSTEMS AND METHODS

CROSS-REFERENCE TO RELATED PATENT APPLICATIONS

This application is a continuation of U.S. patent application Ser. No. 17/530,572, filed Nov. 19, 2021, which is a continuation of U.S. patent application Ser. No. 16/590,171, filed Oct. 1, 2019, which claims the benefit of and priority to (a) U.S. Provisional Patent Application No. 62/739,707, filed Oct. 1, 2018, and (b) U.S. Provisional Patent Application No. 62/739,709, filed Oct. 1, 2018, all of which are incorporated herein by reference in their entireties.

BACKGROUND

In an aspect, the present disclosure relates to systems and methods for recognizing events using one or more camera systems. In another aspect, the present disclosure relates to video messaging systems having network architecture configured to transmit image data from one or more camera systems to one or more network-based clients.

SUMMARY

In an aspect, the present disclosure provides an event recognition system that includes a camera and a controller. The controller is communicatively connectable to the camera, and includes a processor and logic that, when executed by the processor, causes the event recognition system to perform operations including: recognizing an event involving an equipment object based upon image data captured by the camera; executing an event procedure based upon the event, the event procedure including controlling the equipment object; and transmitting the image data to a network-based client based upon the event.

In an embodiment, the camera is mounted on the equipment object, and the equipment object includes a sensor that is communicatively connected to the controller. In an embodiment, recognizing the event is based upon a signal received from the sensor of the equipment object. In an embodiment, controlling the equipment object includes at least one of operating, manipulating, braking, steering, or moving the equipment object.

In an embodiment, recognizing the event includes recognizing the equipment object in the image data.

In an embodiment, the equipment object is a first equipment object, and recognizing the event includes: determining and comparing steps. Determining includes determining, from the image data, a parameter of a first data set, the parameter being: a size of a second equipment object, a shape of the second equipment object, a position of the second equipment object, a physical condition of the second equipment object, a trajectory of the second equipment object, a travel path of the second equipment object, a velocity of the second equipment object, an acceleration or a deceleration of the second equipment object, a distance of the second equipment object from the first equipment object, or a registration marker of the second equipment object. Comparing includes comparing the parameter of the first data set with a corresponding second parameter of a second data set, wherein the corresponding second parameter is retrieved from a reference source. In embodiment, recognizing the event is based upon the parameter of the first data set deviating from the corresponding second parameter of the second data set. In an embodiment, the first equipment object is a passenger boarding bridge, a pre-conditioned air unit, a ground power unit, and a ground support equipment, and the second equipment object is an aircraft or a rotorcraft.

In an embodiment, the network-based client is configured to display the image data on a user interface having a first window and a second window. In an embodiment, the first window is configured to display the image data and the second window is configured to display operating information related to the equipment object.

In an embodiment, the event procedure includes: capturing additional image data from the camera, instructing the camera to follow a pre-defined path, manipulating an industrial device, manipulating an electronic device, manipulating a physical gateway, activating an alarm, and/or communicating with a remote system.

In an embodiment, the camera is a first camera, and recognizing the event includes capturing a first perspective of a second equipment object with the first camera and capturing a second perspective of the second equipment object with a second camera.

In an embodiment, the event recognition system further includes a messaging hub and a video frame transmission service that is communicatively connected to the messaging hub. In an embodiment, the messaging hub is communicatively connectable to the network-based client and configured to transmit the image data as encoded data (e.g., text data) to a second network-based client. In an embodiment, the video frame transmission service is configured to selectively connect with the camera for a time period that is based upon a request received from the network-based client.

In an embodiment, the event recognition system includes the equipment object.

In an embodiment, controlling the equipment object includes controlling the equipment object via the network-based client.

In another aspect, the present disclosure provides a method for controlling an equipment object. The method includes: capturing image data with a camera, recognizing an event based upon the image data, controlling the equipment object based upon the event, and displaying the image data on a network-based client.

In an embodiment, the equipment object is a first equipment object, and recognizing the event includes: determining, from the image data, a parameter of a first data set, the parameter being: a size of a second equipment object, a shape of the second equipment object, a position of the second equipment object, a physical condition of the second equipment object, a trajectory of the second equipment object, a travel path of the second equipment object, a velocity of the second equipment object, an acceleration or a deceleration of the second equipment object, a distance of the second equipment object from the first equipment object, or a registration marker of the second equipment object. In an embodiment, recognizing the event includes comparing the parameter of the first data set with a corresponding second parameter of a second data set, the corresponding second parameter being retrieved from a reference source.

In an embodiment, recognizing the event is based upon the parameter of the first data set deviating from the corresponding second parameter of the second data set.

In an embodiment, recognizing the event is based upon a signal received from a sensor of the equipment object.

In an embodiment, controlling the equipment object includes at least one of operating, manipulating, braking, steering, or moving the equipment object.

In another aspect, the present disclosure provides a video messaging system that includes a plurality of camera systems, a plurality of network-based clients, a messaging hub communicatively connectable to the plurality of network-based clients, and a video frame transmission service communicatively connected to the messaging hub. The messaging hub is configured to transmit image data as encoded data (e.g., encoded text data) to each of the plurality of network-based clients. The video frame transmission service is configured to selectively connect with at least one of the plurality of camera systems for a time period that is based upon a request received from at least one of the plurality of network-based clients.

In an embodiment, the video messaging system includes a controller communicatively connectable to the plurality of camera systems, and having a processor and logic that, when executed by the processor, causes the video messaging system to perform operations including: recognizing an event involving an equipment object based upon image data captured by at least one of the plurality of camera systems; executing an event procedure based upon the event, the event procedure including controlling the equipment object; and transmitting the image data via the video messaging system to at least one of the plurality of network-based clients.

In an embodiment, transmitting the image data includes transmitting the image data via the video frame transmission service and the messaging hub.

In an embodiment, the video messaging system further includes logic that, when executed by the controller, causes the video messaging system to provide the image data capturing the equipment object to at least one of the plurality of network-based clients.

In an embodiment, the video messaging system further includes logic that, when executed by the controller, causes the video messaging system to provide operating information about the equipment object to at least one of the plurality of network-based clients. In an embodiment, the image data relates to the equipment object, and the messaging hub is configured to transmit the image data with the operating information about the equipment object to at least one of the plurality of network-based clients.

In an embodiment, the video messaging system further includes logic that, when executed by the controller, causes the video messaging system to provide image data about the equipment object to a primary window of a user interface of a user interface of the plurality of network-based clients. In an embodiment, the video messaging system further includes logic that, when executed by the controller, causes the video messaging system to provide operating information about the equipment object to a subsidiary window of the user interface.

In an embodiment, the video frame transmission service is configured to manage all image data communicated between the plurality of camera systems and the plurality of network-based clients.

In an embodiment, the video frame transmission service is configured to begin collecting image data from at least one of the plurality of camera systems after receiving the request from at least one of the plurality of network-based clients.

In an embodiment, the video frame transmission service is configured to require at least one of the plurality of network-based clients to request the image data at at least a predetermined frequency in order to maintain a connection with at least one of the plurality of camera systems.

In an embodiment, the video frame transmission service is configured to be unaware which of the plurality of network-based clients use the image data.

In an embodiment, the video frame transmission service is configured to reference a database in response to the request from at least one of the plurality of network-based clients, wherein the database registers each of the plurality of camera systems with a corresponding location.

In another aspect, the present disclosure provides a method of monitoring an equipment object. The method includes: capturing image data with a camera system; recognizing an event based upon a comparison of a first data set and a second data set, the first data set including a parameter about the equipment object determined from the image data, the second data set including a corresponding parameter retrieved from an electronic database; executing an event procedure based upon the event; connecting the camera system to at least one of a plurality of network-based clients based upon a request received from the at least one of the plurality of network-based clients; and transmitting the image data as encoded data to the at least one of the plurality of network-based clients.

In an embodiment, connecting the camera system to the at least one of the plurality of network-based clients includes connecting for a time period that is based upon the request received from the at least one of the plurality of network-based clients.

In an embodiment, the event procedure includes controlling at least one of the equipment object or a second equipment object.

In an embodiment, the method includes providing operating information about the equipment object to the at least one of the plurality of network-based clients along with the image data. In an embodiment, capturing the image data occurs after receiving the request from the at least one of the plurality of network-based clients. In an embodiment, the method includes terminating the camera system from the at least one of the plurality of network-based clients when the at least one of the plurality of network-based clients does not make the request at at least a predetermined frequency. In an embodiment, capturing the image data includes referencing a database in response to the request, and the database registers the camera system with a corresponding location.

DESCRIPTION OF THE DRAWINGS

The foregoing aspects and many of the attendant advantages of this invention will become better understood by reference to the following detailed description, when taken in conjunction with the accompanying drawings, wherein.

DETAILED DESCRIPTION

The present disclosure provides systems and methods that utilize one or more camera systems (e.g., video cameras) in connection with logic (e.g., an algorithm) to recognize an event. Based upon the recognized event, the systems choreograph actions, including the initiation, continuation, adjustment, or cessation of one or more actions, including the interrelation of two or more objects. The systems have broad-ranging applications in a variety of environments, including but not limited to air and space ports, space stations, marine ports, rail terminals and switching yards, transit stations, distribution facilities, manufacturing facilities, warehouses, parking garages, hospitals, schools, hotels, prisons, construction sites, amusement parks, stadiums, event venues, casinos, ski facilities, and other industrial and non-industrial environments. Although systems and methods of the present disclosure are often described herein in the context of an airport environment, the systems and methods are not limited to that particular environment or application. In the following description, terms having common names in different embodiments generally have common features and functionality unless stated otherwise.

Figure 1:
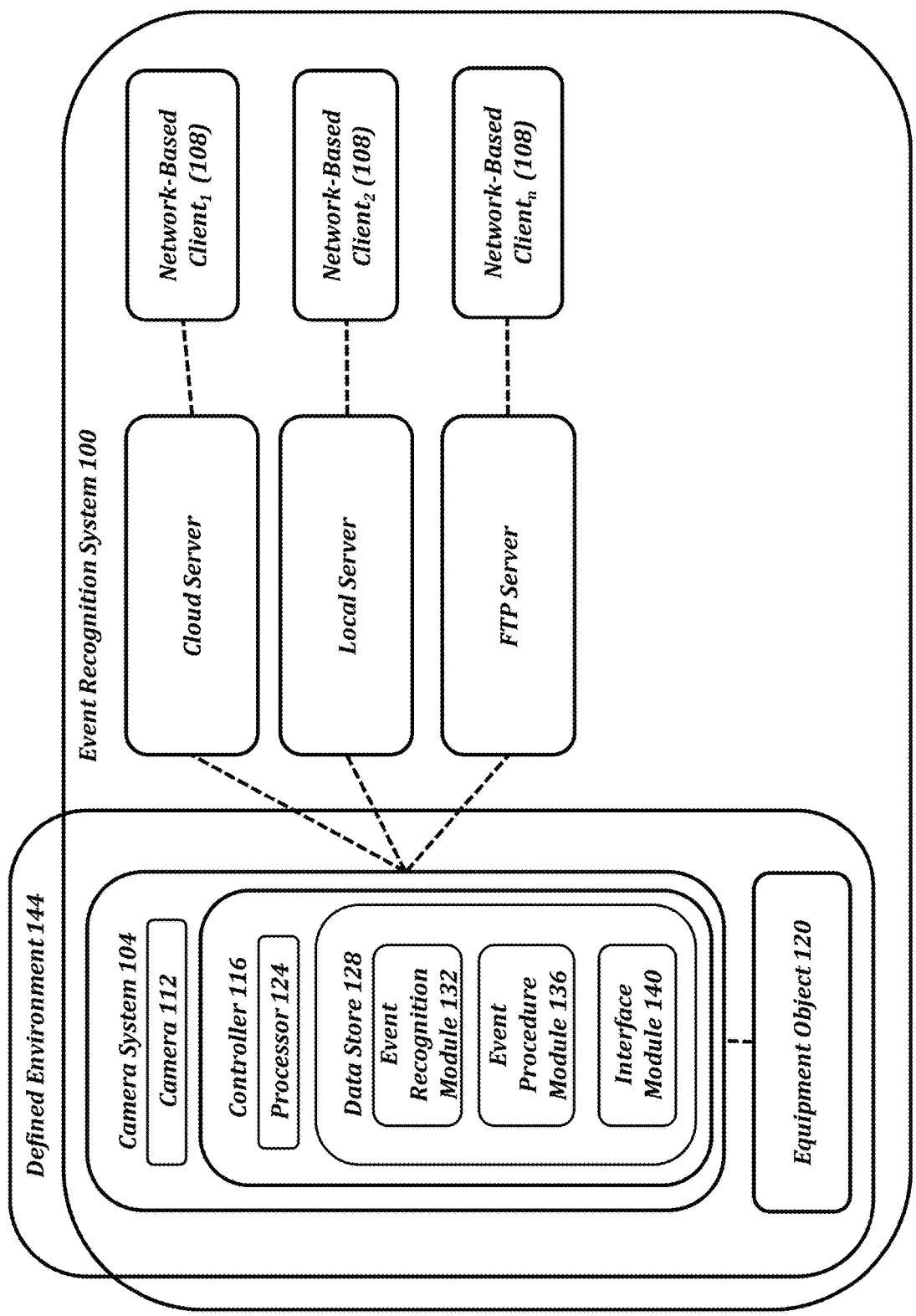
FIG. 1 is a functional block diagram illustrating components of an event recognition system in accordance with an embodiment of the present disclosure.

Referring to FIG. 1, an event recognition system 100 includes one or more camera systems 104 configured to transmit image data to one or more network-based clients 108, which may be located remotely from the camera system 104 (e.g., off-site or at another on-site location). As used herein, image data may include successive video image data frames, such as a stream of MJPEG frames. Each camera system 104 includes at least one camera 112 configured to capture image data in a viewing field. In an embodiment, the camera 112 is an internet protocol (IP) based camera having a range of capabilities. In an embodiment, the camera 112 has a 360 degree view, local storage, an application programming interface (API) to facilitate programming and integration with other systems, an infrared LED for low-light or no-light image capture, one or more data feeds, and/or other features. Representative cameras 112 include models manufactured by ACTi Corporation of Taipei, Taiwan, including camera models Nos. B89 and I42. Each camera 112 is configured to transmit image data (e.g., a specified number of frames per second) via an IP address to a connected client (e.g., a network-based client 108 having a user interface, or a video frame transmission system as described below). In an embodiment, the number of camera systems 104 in the event recognition system 100 ranges from about 1 to about 100,000 or more camera systems 104, e.g., about 10, about 100, about 1,000, about 50,000 camera systems 104, or any other number in that range.

Each camera system 104 also includes at least one controller 116 that is programmed with one or more logic modules (each of which may include one or more trained algorithms). In an embodiment, the controller 116 is physically integrated with the camera 112. In an embodiment, the controller 116 is remote from the camera 112 (e.g., hosted on a server or on a local computer installed near the camera 112). Generally, the controller 116 communicatively connects components of the event recognition system 100. In an embodiment, the controller 116 is communicatively connected to at least one equipment object 120 (described below), to control the at least one equipment object 120. In an embodiment, the controller 116 connects the camera 112 to the equipment object 120. In an embodiment, the controller 116 connects the camera system 104 to at least one network-based client 108 (e.g., a server and/or a user interface). As used in this application, communicative connections include wired and/or wireless communication connections according to one or more known communication protocols.

The controller 116 includes at least one processor 124 and at least one data store 128. The processor 124 controls the operation of the camera system 104 via the execution of one or more logic modules stored within the data store 128. The logic modules are configured to execute event recognition processes, event procedure processes, and user interface processes, as described below. The logic modules may be implemented as software logic (e.g., executable software code), firmware logic, hardware logic, or various combinations thereof. The processor 124 may include one or more general processing units, graphical processing units, application specific integrated circuits, programmable logic controllers, or otherwise. The data store 128 includes one or more event recognition modules 132, event procedure modules 136, and one or more interface modules 140.

The event recognition module 132 is programmed with logic that, when executed, causes the event recognition system 100 to recognize an event (a recognized event), based at least in part upon image data captured by an associated camera 112. In an embodiment, the recognized events include, but are not limited to, at least one of the following types: an equipment object being too close to, or far away from, another object; the equipment object making contact with another object; the equipment object being moved; the equipment object not moving; the equipment object is missing; too many or too few objects; the equipment object crossing a physical threshold; the equipment object in motion; the equipment object deviating from a predetermined velocity, acceleration, temperature, size; the equipment object entering a predetermined area; the equipment object is unattended; and the presence or absence of an identified object, or other event. In an embodiment, the event recognition module 132 recognizes an event by capturing image data from at least one camera 112 and executing one or more algorithms based upon the image data. In an embodiment, the event recognition module 132 performs operations including: computing a first data set based upon image data captured by the camera system 104, comparing the first data set with a second data set, and recognizing an event based at least in part upon comparing the first data set with the second data set. In an embodiment, the event recognition module 132 performs operations including: computing a first value based upon image data captured by the camera system, comparing the first value with a second value that is based at least in part upon the image data or stored data, and recognizing an event based at least in part upon comparing the first value with the second value.

The event procedure module 136 is programmed with logic that, when executed, causes the event recognition system 100 to initiate, continue, adjust, or cease one or more event procedures (actions), including the interrelation of two or more objects, based at least in part upon the recognized event. In an embodiment, the event procedures include, but are not limited to: capturing and/or recording image data from one or more camera systems 104 based upon a recognized event; instructing one or more cameras 112 to follow a pre-defined path and to record image data following the recognition of an event captured by a first camera 112; transmitting image data from one or more camera systems 104 to one or more network-based clients 108 based upon a recognized event; activating, deactivating, and adjusting an industrial device (e.g., a motor, actuator, an engine, a pump, or similar mechanical, electromechanical, hydraulic, or pneumatic device) based upon a recognized event; manipulating an electronic device (e.g., a switch, a transistor, etc.) based upon a recognized event; opening or closing a door of other physical gateway based upon a recognized event;

turning a light on or off based upon a recognized event; turning an alarm on or off based upon a recognized event; initiating a communication with a remote system (e.g., other modules of a video messaging system) based upon a recognized event; manipulating (e.g., operating, braking, steering, moving) an equipment object (the equipment object may or may not be captured by the image data); and other event procedures.

The user interface module 140 is programmed with logic that controls the transmission and recording of image data. The user interface module 140 communicates with the event recognition module 132 and event procedure module 136. In an embodiment, the user interface module 140 transmits image data (e.g., live image data) from the camera 112 to one or more network-based clients 108 having user interfaces, search real-time image data from the camera 112, capture and record image data based upon a recognized event, send image data through e-mail, text message, or other format, play back image data (from one or more cameras) on one or more user interfaces without downloading the data, and/or synchronize image data and event playback for simultaneous viewing.

Each camera system 104 and equipment object 120 is physically located within an environment 144 that presents unique physical constraints and environmental demands on the event recognition system. As noted above, representative environments 144 include: air and space ports, space stations, marine ports, rail terminals and switching yards, transit stations, distribution facilities, manufacturing facilities, warehouses, parking garages, hospitals, schools, hotels, prisons, construction sites, amusement parks, stadiums, event venues, casinos, ski facilities, and other industrial and non-industrial environments. As one example, an airport environment is characterized by large temperature variations, precipitation, vibration, large variations in light, electromagnetic signal interference, etc. Representative equipment objects 120 commonly found in airport environments include but is not limited to aircraft, rotorcraft, passenger boarding bridges ("PBBs"); pre-conditioned air units ("PCAs"); ground power units ("GPUs"); ground support equipment ("GSE") such as trucks, loaders, deicers, tugs, tractors, trailers, baggage vehicles, buses, etc.; baggage handling systems; aircraft bridges; elevators; escalators; access systems; HVAC systems; security systems (including doors, gates, audiovisual alarm systems, threat detections systems); and other systems. The camera systems 104 described herein are configured to communicatively connect to at least one such equipment object.

Each camera system 104 is further configured to communicatively connect with and transmit image data to at least one network-based client 108, including those having a user interface. Potential network types include internet-based "cloud" networks of distributed servers, wide area networks, local area networks, and other network types. User interfaces may be accessible via a web browser, software, or firmware that is installed locally or remotely. In an embodiment, one or more network-based client 108 is physically located outside the environment 144 (e.g., at a geographically distinct location from the environment 144), and one or more network-based clients 108 is located within the environment 144. In an embodiment, the event recognition system 100 includes one or more network-based clients 108. In an embodiment, the event recognition system 100 does not include the network-based client 108.

Figure 2:
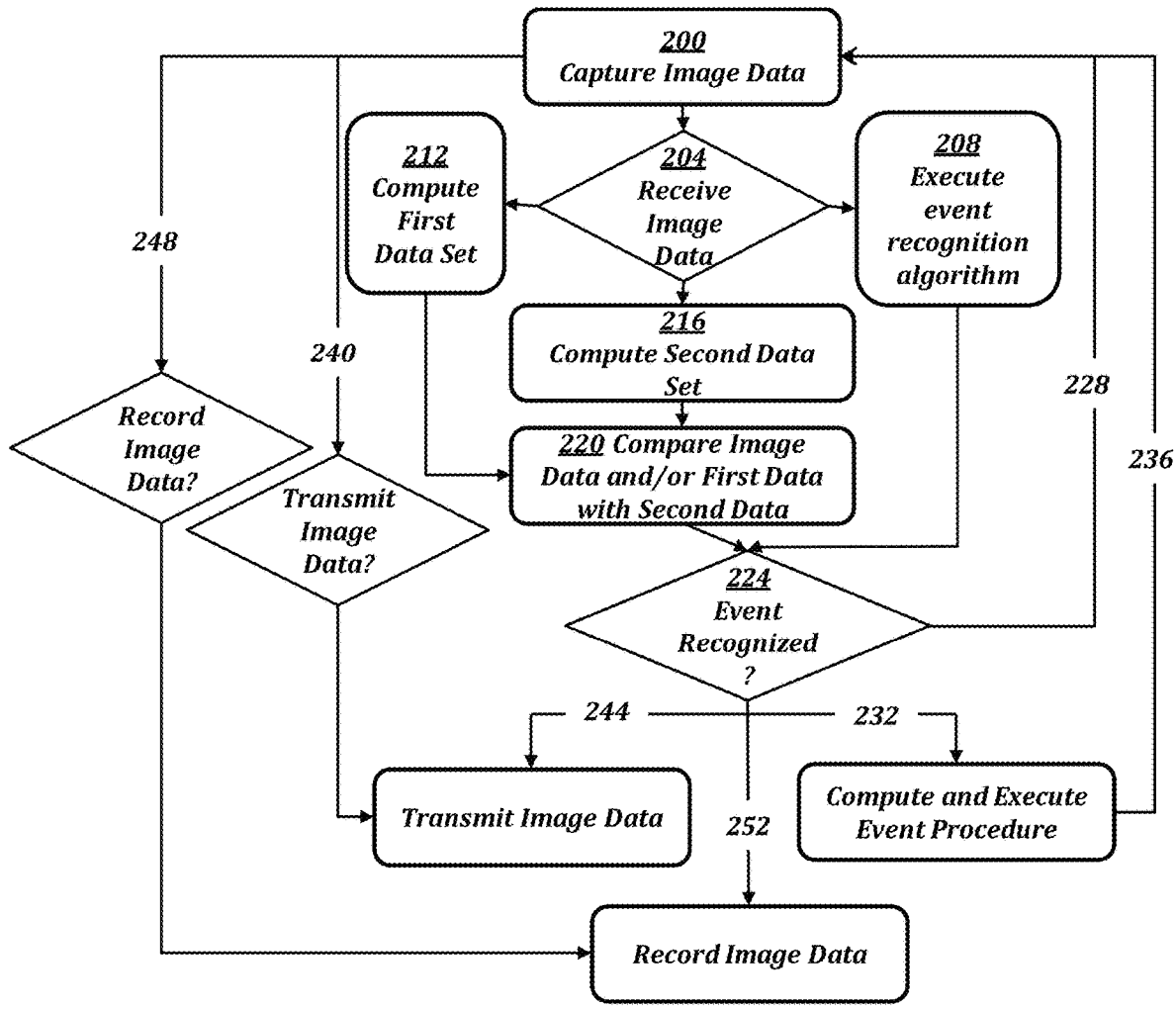
FIG. 2 is a process diagram illustrating a process of operation of an event recognition system, in accordance with an embodiment of the disclosure.

FIG. 2 illustrates a method of operation of an event recognition system (such as the event recognition system 100 of FIG. 1), in accordance with an embodiment of the disclosure.

At step 200, the event recognition system captures image data from one or more camera systems (including one or more cameras). If the captured image data originates from more than one camera, it may or may not correspond to the same subject matter. In other words, different cameras may have different viewing fields that may or may not overlap. In an embodiment, image data from more than one camera at least partially corresponds to the same subject matter. For instance, a first camera system may capture image data of an equipment object from a first perspective and a second camera system may capture image data of the same equipment object from a second perspective.

At step 204, a controller of the event recognition system receives image data from one or more camera systems. Having received the image data, the controller then executes one or more of steps 204, 208, 212, 216, 220, and 224 (described below) in order to recognize an event. In an embodiment, the controller executes step 208, but not steps 212, 216, or 220. In an embodiment, the controller executes step 208, 212, 216, and 220. In an embodiment, the controller executes steps 212, 216, and 220, but not step 208.

At step 208, the controller executes an event recognition algorithm based at least in part upon the image data. In an embodiment, the event recognition module is programmed with one or more event recognition algorithms, which may receive the image data as an input and execute the event recognition module to determine whether one or more events is recognized. In an embodiment, the recognition of an event includes identifying one or more aspects of the particular recognized event based upon the image data, including the type of event, e.g., a safety event, an event involving contact between two objects (a "contact event", etc.), a magnitude, a time of the event, an identity of one or more objects or humans involved in the event, or other classification. In an embodiment, the recognition of an event is a binary "yes" or "no" determination. In an embodiment, the recognition of an event includes identifying a first equipment object and/or a second equipment object in the image data.

At step 212, the controller determines, computes, identifies, extracts, and/or otherwise processes a first data set based upon the image data. In an embodiment, the first data set includes one or more of parameters based upon the image data, including one or more objects that appear in the image data and/or properties of the image data. In an embodiment, the parameters include at least one of: a size, a shape, a position, a velocity, an acceleration, a distance, a depth, a volume, a mass, a color, a light level, a temperature, an identity, a time, a registration marker, and/or other parameter. In an embodiment, one or more of the foregoing variables are based upon and/or relate to a first equipment object and/or a second equipment object captured in the image data.

At step 216, the controller determines, computes, identifies, extracts, and/or otherwise processes a second data set. In an embodiment, the second data set is based at least partially upon the image data. In an embodiment, the second data set is retrieved from a reference source such as a memory or database (e.g., an electronic database which may be locally or remotely hosted). In an embodiment, the second data set includes one or more types of data identified with respect to the first data set, which may be based upon data obtained from the reference source. In an embodiment, data obtained from the reference source includes reference image data. In an embodiment, the second data set includes one or more reference parameters, including at least one of: a reference size, a reference shape, a reference position, a reference velocity, a reference acceleration, a reference distance, a reference depth, a reference volume, a reference mass, a reference color, a reference light level, a reference temperature, a reference identity, a reference time, a reference registration marker, and/or other reference parameter. In an embodiment, one or more of the foregoing variables are based upon and/or relate to the first equipment object and/or a second equipment object captured in the image data.

At step 220, the controller compares parameters of the first data set and the second data sets, e.g., to determine matches between the first and second data sets and/or deviations from the first data set relative to the second data set. In an embodiment, the controller determines that a parameter of the first data set differs from a corresponding parameter of the second data set. In an embodiment, the parameter of the first data set is an operating parameter of an equipment object, and the corresponding parameter of the second data set is a predetermined operating parameter of the equipment object.

At step 224, the controller determines whether or not an event is recognized, based upon one or more matches, deviations, or other computations. In an embodiment, the recognition of an event includes generating one or more specific aspects of the recognized event (e.g., labeling the event as a "safety event," etc.). In an embodiment, recognizing the recognized event is based upon a parameter of the first data set deviating from a corresponding second parameter of the second data set, e.g., by more than a predetermined threshold.

The determination from one or more of the foregoing steps (e.g., from the execution of one or more event recognition algorithms at step 208, and/or from the execution of one or more computation and comparison steps 212, 216, 220) serve as inputs to determine whether to execute an event procedure, and/or to repeat the process beginning via pathway 228. In some embodiments, steps 200 through 224 are repeated substantially continuously (e.g., as a feedback loop) regardless of whether an event is recognized.

At step 232, if the controller recognizes an event (i.e., determines that at least one recognized event has occurred), then the controller utilizes the recognized event as an input to: associate the recognized event with one or more event procedures (including any event procedure described above); determine a correct event procedure, and to execute one or more event procedures, such as by transmitting instructions to one or more equipment objects. In an embodiment, the controller instructs one or more camera systems to commence or continue collecting image data through path 236. In an embodiment, the controller instructs the camera system to transmit image data from one or more cameras (which may be the same or different from the cameras the captured the image data) to one or more network-based clients via pathways 240 and 244, and to record image data (such as on a local storage or remote server) via pathways 248 and 252, regardless of whether the controller executes an event procedure module and regardless of whether the controller recognizes an event. In an embodiment, the controller instructs the camera system to transmit image data from one or more cameras to one or more network-based clients using one or more aspects of a video messaging system as described below. In an embodiment, the event procedure includes: capturing additional image data from one or more cameras of the camera system; instructing a camera of the camera system to follow a pre-defined path; manipulating an industrial device (e.g., a motor, actuator, an engine, a pump, or similar mechanical, electromechanical, hydraulic, or pneumatic device); manipulating an electronic device (e.g., a switch, a transistor, etc.); manipulating a physical gateway (e.g., a door); activating an alarm; and communicating with a remote system.

Figure 3:
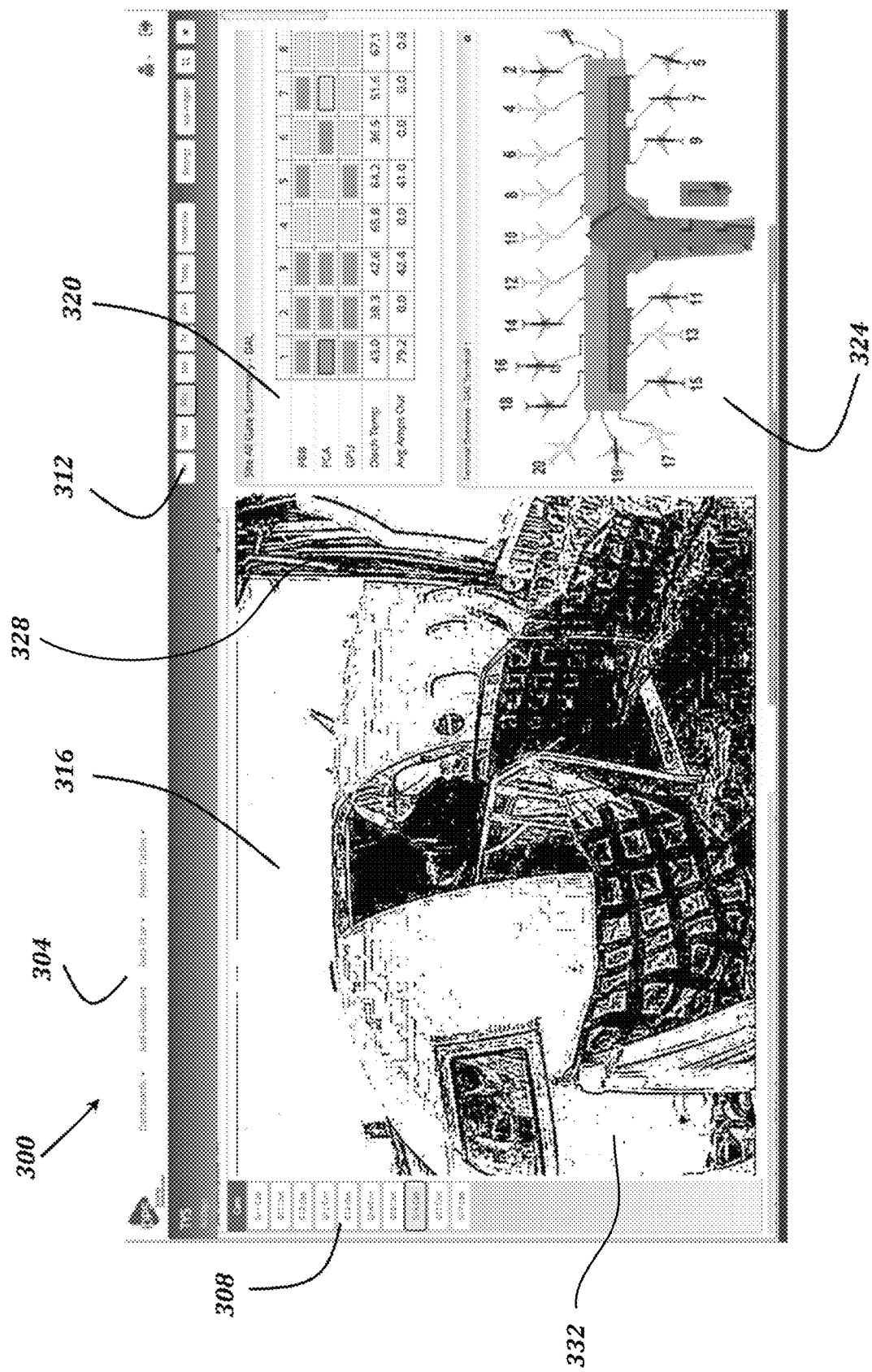
FIG. 3 is an illustration of a user interface for viewing image data, in accordance with an embodiment of the disclosure.

FIG. 3 shows a representative user interface 300 of an event recognition system. In some embodiments, network-based clients of the event recognition system described herein are configured to display a user interface such as shown in FIG. 3. The user interface 300 presents image data in such a way that makes it more intuitive and otherwise increases its utility. The user interface 300 includes a primary window 304. In an embodiment, the primary window 304 includes a first utility menu 308 positioned along one side of the primary window 304. Some embodiments additionally or alternatively include a second utility menu 312 positioned along a second side of the primary window 304. Some embodiments additionally or alternatively include additional utility menus. Some embodiments include additional utility menus having different placement within the primary window 304. In an embodiment, each utility menu 308, 312 provides a user one or more value-added tools, for example tools that: trigger a predefined view; control camera direction and focus; control camera filter; define grids; zoom; pan; access raw camera image data from memory; present image data associated with a particular recognized event or recognized event type; control playback and storage of image data; annotate objects that appear in the image data (either manually or utilizing an automated recognition algorithm); measure aspects of the image data; present image data associated with a particular camera system or equipment object; present image data from a particular time period; and/or change or cycle the camera providing the image data. In an embodiment, a first subsidiary window 316 displays image data associated with one or more camera systems, e.g., in real time or recorded historical image data. In the non-limiting embodiment of FIG. 3, the first subsidiary window displays image data that includes a first equipment object (a passenger boarding bridge 328) and a second equipment object (an aircraft 332). In an embodiment, the image data includes the first equipment object, but not the second equipment object. In an embodiment, the image data includes the second equipment object, but not the first equipment object. In an embodiment, the first subsidiary window 316 is larger than other subsidiary windows, although this is not essential. In an embodiment, a second subsidiary 320 window is positioned near or adjacent the first subsidiary window 316, and/or overlays part of the first subsidiary window 316. The second subsidiary window 320 is configured to present information that is associated with one or more equipment objects, camera systems or other systems. In an embodiment, the presented information includes operating information associated with one or more of the equipment objects, such as temperature, voltage, current, speed, location, rpm, attitude, etc. In an embodiment, the primary window 304 is configured to display image data (e.g., image data relating to an equipment object) and at least one of the first subsidiary window 316 and the second subsidiary secondary window 320 is configured to display operating information (e.g., operating information relating to an equipment object). In an embodiment, in an airport environment, a camera system is configured to communicatively connect to an equipment object such as a PBB, a PCA, and/or a GPU. In such embodiments, the first subsidiary window 316 is configured to present image data captured by the camera system and the second subsidiary window 320 is configured to present industrial data associated with the connected PBB, PCA, and GPU. Presenting image data next to associated equipment data advantageously provides an operator an intuitive interface to recognize and understand events captured by the camera system, along with associated event procedures.

As one non-limiting example, the first subsidiary window 316 is configured to present image data captured by a camera system installed upon a PBB, and the second subsidiary window 320 is configured to present voltage data associated with a wheel motor of the PBB. In an embodiment, a significant deviation in the voltage data presented in the second subsidiary window 320 coincides with the occurrence of an event that is recognized by the camera system and captured in its image data (e.g., a collision between the PBB and another object). In an embodiment, the primary window 304 is configured to include additional subsidiary windows that present different information that may or may not be associated with the camera system providing the image data to the first subsidiary window 316. In an embodiment, a third subsidiary window 324 is configured to present a time log of instances of particular recognized event types, a map of connected camera systems, industrial data from another equipment unit associated with the camera system, and/or other type of information. These examples are representative and not intended to limit the orientation or capabilities of the user interfaces described herein.

Having described the foregoing aspects of the event recognition system, representative applications of the event recognition system will now be discussed to illustrate specific structures and functions.

Figure 4:
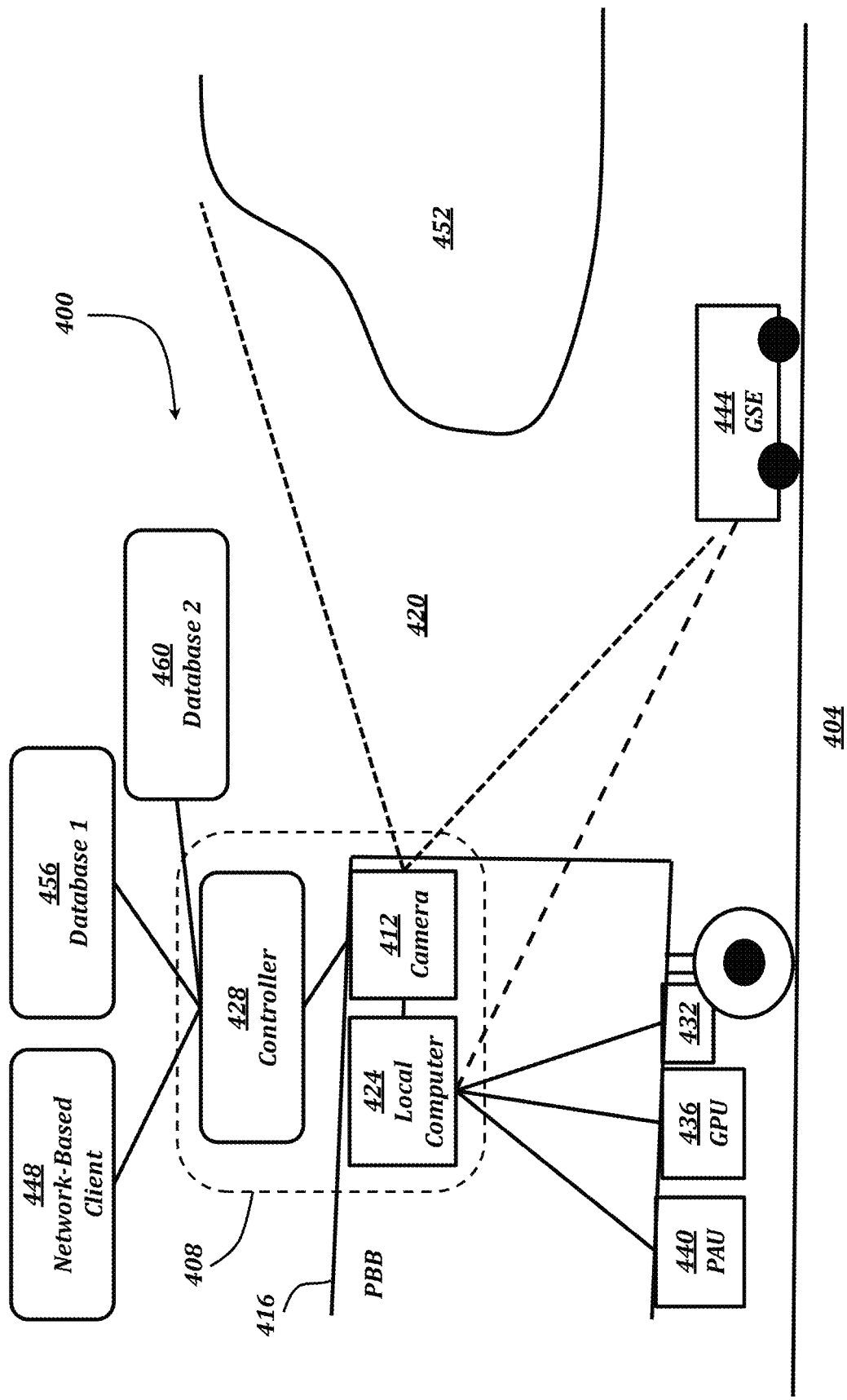
FIG. 4 is an illustration of an event recognition system in an airport environment, in accordance with an embodiment of the disclosure.

FIG. 4 illustrates one embodiment of an event recognition system 400 operating in an airport environment 404 that includes a plurality of equipment objects. The system includes a camera system 408 having a camera 412 mounted on a passenger boarding bridge ('PBB') 416, the camera 412 have a viewing field 420 that encompasses aspects of a tarmac outside the PBB 416. The camera system 408 also includes a local computer 424 that provides data storage for connectivity with a controller 428 that is hosted on a remote server, and to provide connectivity with a plurality of nearby equipment objects, for example a PLC 432 that controls a PBB wheel motor and steering system and a height adjustment system, a pre-conditioned air unit ("PCA") 436; a ground power unit ("GPU") 440; and a loading truck 444 (a type of ground support equipment). Each of the PBB 416, the PLC 432, PCA 436, the GPU 440, and the loading truck 444 are equipment objects. The controller 428 is connected to one or more network-based clients 448 that are implemented as browser-based user interfaces.

The controller 428 is configured to recognize one or more events. In one representative scenario, an aircraft 452 taxis toward the PBB 416. The aircraft 452 is another equipment object. The camera 412 captures video image data of the approaching aircraft 452, e.g., at about five frames per second. In some embodiments, the camera 412 captures video image data that additionally includes one or more of the previously-identified equipment objects. The camera 412 transmits the video image data to the controller 428 in real-time (e.g., via a cellular network), and substantially continuously processes the image data. In an embodiment, the controller 428 determines a size, shape, distance, and velocity of the approaching aircraft 452. In an embodiment, the controller 428 recognizes the aircraft's registration number from the image data. In an embodiment, based upon a comparison of the computed size and shape with a reference size and shape obtained from a first database (e.g., a database 456), the controller 428 determines an aircraft identification corresponding to the approaching aircraft 452 (e.g., the aircraft identification identifies the aircraft as a Boeing 777). In an embodiment, the controller 428 verifies the aircraft identification by comparing the registration number identified in the image data with a known aircraft type/registration number pair retrieved from a second external database 460 (e.g., a third party information service). In an embodiment, the controller 428 determines a velocity of the approaching aircraft 452 based upon the size and location of the aircraft 452 in different image data frames that are separated by a known time value. In an embodiment, the controller 428 verifies the computed velocity against a reference velocity provided by a GPS system. In an embodiment, based upon the aircraft identification and a determined velocity, the controller recognizes an event as "aircraft approaching PBB."

The controller 428 is configured to cause the event recognition system 400 to perform one or more tasks based upon one or more recognized events. In an embodiment, the controller 428 instructs the camera 412 to record video image data on the local computer 424 (e.g., in 10 minute continuous overwrite mode) and/or to transmit video image data to one or more network-based clients 448 (such as a browser-based user interface owned by the airline associated with the approaching aircraft 452), e.g., for a preset duration or for a duration of the recognized event. In an embodiment, the controller 428 positions the PBB 416 at the correct distance away from where the aircraft 452 will come to a stop, e.g., by instructing the PLC 432 that controls PBB steering system, wheel motor, and height adjustment systems to maneuver the PBB 416 to a position coordinate and to adjust its height such that it is positioned at the correct height for the approaching aircraft 452. In an embodiment, the controller 428 causes one or more additional cameras (not shown) to capture and record image data in relation to the approaching aircraft 452 (e.g., of the aircraft 452 and/or the surrounding environment). In an embodiment, the controller 428 instructs a second camera to capture image data for a time period, and then a third camera to capture image data after the second time period expires. The additional image data captured by the second and third cameras may be utilized by the controller 428 to compute additional information (e.g., a position of the aircraft 452) and/or to recognize additional events (e.g., an object approaching the aircraft 452). In an embodiment, as the aircraft 452 approaches, the camera system 408 substantially continuously captures image data and utilizes the image data (e.g., in conjunction with other data sources) to determine changes in the aircraft's position, height, velocity, and other variables. In an embodiment, when the camera system 408 determines that the aircraft 452 has stopped, the controller 428 instructs the PLC 432 to maneuver the PBB 416 to make contact with the aircraft 452 for safe passenger and crew loading and unloading. In an embodiment, the controller 428 manipulates one or more of the previously identified equipment objects, e.g., based upon the image data.

The event recognition system 400 is configured to simultaneously recognize more than one event. In an embodiment, the controller 428 recognizes a first event (e.g., "Boeing 777 approaching PBB") and a second event (e.g., "ground support equipment obstructing pathway of approaching aircraft"). In an embodiment, the controller 428 is configured to recognize an event based upon one or more other events. In the previous example, the controller 428 recognizes a third event (e.g., "imminent collision") based upon the first event and the second event. In an embodiment, the controller 428 causes the camera system 408 to record image data of the aircraft 452. In an embodiment, the controller 428 causes the event recognition system 400 to activate one or more alarms and/or communications, e.g., to alert the pilot of the approaching aircraft 452.

In an embodiment, the controller recognizes that the parked aircraft 452 is ready to receive pre-conditioned air from the PCA 440 or ground power from the GPU 436 by identification from the image data that corresponding PCA and GPU hookups are in-place. Accordingly, the controller 428 causes the PCA 440 to provide preconditioned air at a predetermined temperature to the parked aircraft 452 for a predetermined time period, or until an internal temperature of the aircraft reaches a predetermined target (e.g., as determined by a sensor inside the aircraft 452). In an embodiment, the controller 428 instructs the GPU 436 to provide power to the aircraft 452.

Another embodiment of an event recognition system configured to operate in an airport environment includes a camera system including a controller and a camera. The camera is mounted on a unit of ground support equipment ("GSE"—an equipment object), such as a loader. The camera has a viewing field that encompasses approximately a 360-degree bird's eye view of the equipment operator. The controller is communicatively connected to an electronic control unit ("ECU") of the GSE. The loader is equipped with at least one sensor (e.g., a touch-sensitive bumper or a proximity sensor) that is communicatively connected to the camera system, e.g., wirelessly. In an embodiment, the sensor is connected to an external monitoring system (e.g., a cloud-based video messaging system) that is communicatively connected with the event recognition system via the controller or at least one network-based browser. The camera is configured to capture image data of the GSE operator, the GSE, and its surrounding environment. The controller is configured to cause the event recognition system to execute one or more actions based upon the image data and/or based upon a signal received from the sensor of the equipment object. In an embodiment, the controller determines if the GSE is about to contact another object, e.g., an aircraft, and/or has made contact. Thus, the controller is configured to recognize an "imminent contact event" and/or a "contact event." If the event recognition system recognizes an "imminent contact event" between the GSE and another object, then the controller is configured to execute one or more procedures, e.g., controlling the equipment object by operating, manipulating, braking, steering, moving, accelerating, or otherwise repositioning the equipment object. In some embodiments, the controller activates an alarm to alert the GSE operator and/or instructs the GSE ECU to apply the brakes. In some embodiments, if the event recognition controller recognizes an "imminent contact event" or a "contact event," then the controller is configured to transmit video image data to one or more remote user interfaces, to record video image data (e.g., both preceding and following the moment of contact), and/or to transmit a message to one or more systems (e.g., an event log message).

An embodiment of an event recognition system configured to operate in food process environment includes a camera system having a controller and a camera. In an embodiment, the food process environment includes a bottle capping line (an equipment object) in which a screw cap is added to a bottle in a sterile environment. The process may provide screw caps from a lane that is monitored by a camera system that captures video image data. The controller substantially continuously checks if the caps are in the correct position relative to each bottle. If the event recognition system determines that a cap that is in the wrong position (e.g., upside down), then it will recognize a "reject event." Accordingly, the controller instructs another equipment object (e.g., a hopper) to turn the rejected cap(s) into the correct position. The controller is configured to instruct the hopper and/or the production line to shut down if "reject events" continue to occur at rate that exceeds a predetermined rate. In some embodiments, the controller is configured to instruct the camera to transmit video image data to at least one network-based browser and/or to record image data in relation to the rejected cap and its correction, e.g., from about five seconds before the rejection of the cap to after the correction of the cap by the hopper. If for some reason the hopper malfunctions, the recorded video image data will enable an operator to analyze the root cause.

Another embodiment of an event recognition system configured to operate in food process environment includes a camera system having a controller and a camera. The camera system is configured to capture image data of infeed scrolls (equipment objects) that transport filled bottles, e.g., about 24 or 32 bottles at a time. The controller is configured to substantially continuously analyze the image data, such as to determine whether a bottle is missing (a "missing bottle event"). In some embodiments, when a "missing bottle event" is recognized, the controller is configured to instruct a downstream machine to place a replacement bottle in the vacancy left by the missing bottle. In some embodiments, the camera is configured to transmit video image data to at least one network-based browser and/or to record image data in relation to the incorrect bottle pickup, e.g., from about five seconds before the pickup to after the pickup, to enable an operator perform root cause analysis.

The foregoing applications of event recognition systems are representative and not exhaustive. The event recognition systems described herein may be applied to numerous applications. Any of the foregoing functionalities described in the context of any particular environment (e.g., an airport environment or a food process environment) may be applied to any other environment.

In an embodiment, one or more camera systems of the event recognition system may communicatively connect with one or more network-based clients through a video messaging system. The video messaging system may include a video module having a network architecture that enables communication of image data with a high degree of efficiency and security.

Figure 5:
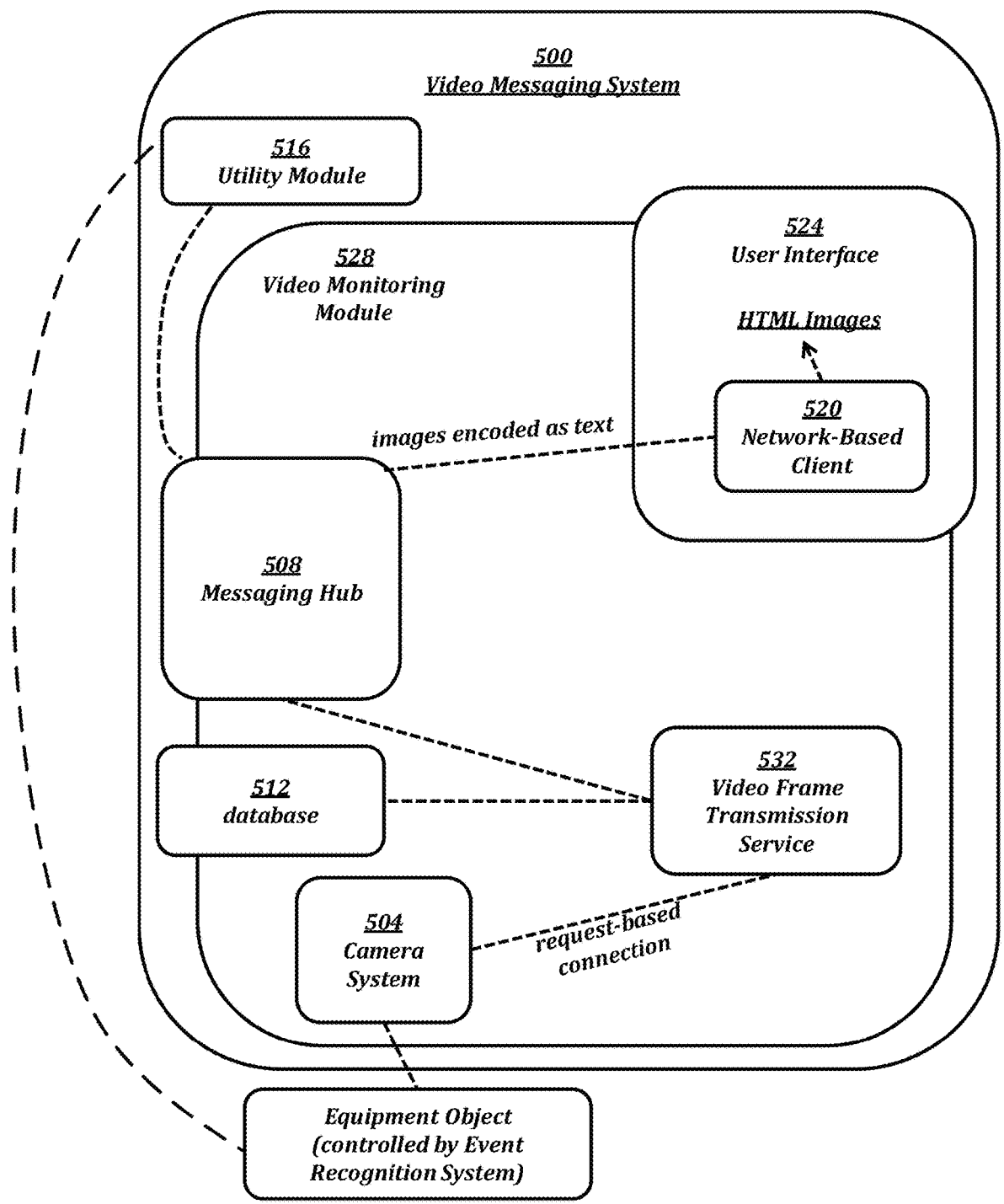
FIG. 5 is a schematic diagram illustrating a representative network architecture, in accordance with an embodiment of the disclosure, that may be utilized as part of an event recognition system.

FIG. 5 shows a video messaging system 500 configured to integrate (i.e., communicatively connect) with an event recognition system as described above (e.g., via a camera system 504). In such embodiments, the video messaging system 500 is configured to include any one or more of the features of the event recognition systems described herein. Each camera system 504 is configured as described above with respect to the event recognition system. In an embodiment, the video messaging system 500 is implemented independently of the event recognition system. In an embodiment, the video messaging system 500 includes a messaging hub 508, a database 512, one or more utility modules 516, and one or more network-based clients 520, all of which are communicatively connected. Each of the utility modules 516 may be implemented as software logic (e.g., executable software code), firmware logic, hardware logic, or various combinations thereof stored on a data store, and executed by one or more processors.

In an embodiment, each network-based client 520 is a browser-based client that includes a user interface 524 (such as described above with respect to FIG. 3). In some embodiments, each user interface 524 includes one or more functional tools, for example tools that: trigger a predefined view, control camera direction and focus, control camera filter, define grids, zoom, pan, access raw camera image data from memory, present image data associated with a particular recognized event or recognized event type, control playback and storage of image data, annotate objects that appear in the image data (either manually or utilizing an automated recognition algorithm), measure aspects of the image data, present image data associated with a particular camera system or equipment object, present image data from a particular time period, change or cycle the camera providing the image data, etc. In some embodiments, events recognized by the video messaging system 500 and/or event recognition system (e.g., alarm tags) trigger the broadcast and storage of image data to/from at least one of the camera systems 504.

Each utility module 516 is configured to provide data (e.g., industrial data) from a data source to one or more network-based clients 520. Representative data sources include sensors provided with any number of equipment objects and mechanical or electromechanical systems commonly found in the following environments: air and space ports, space stations, marine ports, rail terminals and switching yards, transit stations, distribution facilities, manufacturing facilities, warehouses, parking garages, hospitals, schools, hotels, prisons, construction sites, amusement parks, stadiums, event venues, casinos, ski facilities, and other industrial and non-industrial environments. In an embodiment, representative data sources include equipment objects including aircraft, rotorcraft, passenger boarding bridges ('PBBs'); pre-conditioned air units ('PCAs'); ground power units ('GPUs'); ground support equipment ('GSE') such as trucks, loaders, deicers, tugs, tractors, trailers, baggage vehicles, buses, etc.; baggage handling systems; aircraft bridges; elevators; escalators; access systems; HVAC systems; security systems (including doors, gates, audiovisual alarm systems, threat detections systems); and other systems. Representative data that may be provided by the utility module 516 to one or more network-based clients 520 includes operating information associated with one or more equipment objects, such as temperature, voltage, current, speed, location, rpm, attitude, etc.

In addition to one or more utility modules 516, the video messaging system 500 includes at least one video monitoring module 528 that provides image data (e.g., video image data) from at least one camera system 504 to at least one requesting network-based client 520 (e.g., a browser-based client that includes a user interface 524). Each video monitoring module 528 includes at least one camera system 504 and a video frame transmission service 532 ('VFTS'). The video monitoring module 528 communicates with other elements of the video messaging system 500, namely the messaging hub 508, the network-based clients 520, and the database 512.

In an embodiment, the VFTS 532 manages all image data transmissions from the camera systems 504 to requesting network-based clients 520. The VFTS 532 may be implemented as a custom built service (e.g., a .net object oriented Microsoft Windows service) that connects to the one or more camera systems 504 as a single client and collects image data (e.g., frames of video) in a queue. In an embodiment, to conserve bandwidth, the VFTS 532 connects to any given camera system 504 and begins collecting image data for transmission only when it is requested to do so by a requesting network-based client 520 (e.g., a browser-based client having a user interface). In an embodiment, the VFTS 532 requires at least one requesting network-based client 520 to request image data (e.g., frames) from a certain camera system 504 at at least a minimum predetermined frequency (e.g., every five seconds) to create and maintain the connection; otherwise, the VFTS 532 terminates the camera connection and stops transmitting image data (i.e., a request-based connection). The VFTS 532 manages a set of "Camera Transmitter" objects, each of which assigned to one camera system 504. In an embodiment, the Camera Transmitter object(s) is the only entity(ies) that connects to the camera system(s) 504 from the video messaging system 500. Each Camera Transmitter object collects image data from the camera system(s) 504 as they arrive and places them in a queue for encoding (e.g., base 64 encoding) and transmission to any and all requesting network-based clients 520 through the messaging hub 508. In an embodiment, each request-based connection ceases when (or after a predefined time period after) requests from network-based clients 520 cease. In an embodiment, the VFTS 532 is configured to be unaware what network-based clients 520 use the image data.

The messaging hub 508 operates as a central "train station" for real-time message traffic for the video messaging system 500, including utility modules 516 and the video monitoring module 528. In one embodiment, the messaging hub 508 is implemented as a Microsoft SignalR platform (or similar) that is configured to act as a black-box connection mechanism that includes one or more client modules for a plurality of disparate programming languages. A client module is configured to negotiate an optimal connection protocol in each relevant language (e.g., between a network-based user interface and the VFTS) and to maintain a persistent connection without any programmer input. The messaging hub 508 allows any connected client (e.g., a network-based client 520 having a user interface, and/or the VFTS 532) to send data to any other client, any group of clients, or all other connected clients simultaneously. In an embodiment, to conserve bandwidth, the messaging hub 508 is configured to transmit encoded image data in conjunction with other encoded information (including non-image information) provided by at least one of the utility modules 516 (e.g., as a combined message). In an embodiment, the messaging hub 508 is configured to transmit encoded image data about an equipment object with encoded non-image information provided by at least one of the utility modules 516 about the equipment object. In an embodiment, the messaging hub 508 is configured to transmit messages as base-64 encoded text data that includes both image and non-image encoded data.

In an embodiment, each network-based requesting client 520 is implemented as a browser-based user interface. In an embodiment, the requesting network-based client 520 is implemented as a browser-based SignalR client, i.e., a Javascript implementation of a SignalR client, which may be implemented as an AngularJS service. The requesting network-based client 520 is configured to receive encoded messages from any other connected client via the messaging hub 508, and then to use an AngularJS broadcast facility to distribute messages to the AngularJS ecosystem. In an embodiment, each requesting network-based client 520 includes a user interface 524 having one or more video monitoring widgets (e.g., in a browser), such as HTML image elements. In an embodiment, each image element in the video monitoring widget is switched out every time a frame arrives.

The database 512 contain data structures (e.g., tables) that persist camera and camera assignment data. Cameras are registered in the database and assigned to locations, sites, and/or gates via an administrator level user of the video messaging system 500. In an embodiment, the VFTS 532 is configured to use data from the database 512 to establish on-demand video requests for image data from one or more requesting network-based clients 520. In an embodiment, the VFTS 532 is configured to reference a database in response to the request from at least one of the plurality of network-based clients. The database registers each of the plurality of camera systems with a corresponding location.

While illustrative embodiments have been illustrated and described, it will be appreciated that various changes can be made therein without departing from the spirit and scope of the invention.

Generally, connections between operative components may be wired or wireless, and may be direct or indirect. Regardless, any component can be connected to a network that ultimately provides a connection to any other component.

Event recognition systems disclosed herein utilize circuitry in order to implement technologies and methodologies described herein, operatively connect two or more components, generate information, determine operation conditions, control an appliance, device, or method, and/or the like. Circuitry of any type can be used. In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), or the like, or any combinations thereof, and can include discrete digital or analog circuit elements or electronics, or combinations thereof.

In an embodiment, circuitry includes one or more ASICs having a plurality of predefined logic components. In an embodiment, circuitry includes one or more FPGA having a plurality of programmable logic components. In an embodiment, circuitry includes hardware circuit implementations (e.g., implementations in analog circuitry, implementations in digital circuitry, and the like, and combinations thereof). In an embodiment, circuitry includes combinations of circuits and computer program products having software or firmware instructions stored on one or more computer readable memories that work together to cause a device to perform one or more methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like. In an embodiment, circuitry includes a baseband integrated circuit or applications processor integrated circuit or a similar integrated circuit in a server, a cellular network device, other network device, or other computing device. In an embodiment, circuitry includes one or more remotely located components. In an embodiment, remotely located components are operatively connected via wireless communication. In an embodiment, remotely located components are operatively connected via one or more receivers, transmitters, transceivers, or the like.

An embodiment includes one or more data stores that, for example, store instructions or data. Non-limiting examples of one or more data stores include volatile memory (e.g., Random Access memory (RAM), Dynamic Random Access memory (DRAM), or the like), non-volatile memory (e.g., Read-Only memory (ROM), Electrically Erasable Programmable Read-Only memory (EEPROM), Compact Disc Read-Only memory (CD-ROM), or the like), persistent memory, or the like. Further non-limiting examples of one or more data stores include Erasable Programmable Read-Only memory (EPROM), flash memory, or the like. The one or more data stores can be connected to, for example, one or more computing devices by one or more instructions, data, or power buses.

In an embodiment, circuitry includes one or more computer-readable media drives, interface sockets, Universal Serial Bus (USB) ports, memory card slots, or the like, and one or more input/output components such as, for example, a graphical user interface, a display, a keyboard, a keypad, a trackball, a joystick, a touch-screen, a mouse, a switch, a dial, or the like, and any other peripheral device. In an embodiment, circuitry includes one or more user input/output components that are operatively connected to at least one control device (electrical, electromechanical, software-implemented, firmware-implemented, or other control device, or combinations thereof).

In an embodiment, circuitry includes a computer-readable media drive or memory slot configured to accept signal-bearing medium (e.g., computer-readable memory media, computer-readable recording media, or the like). In an embodiment, a program for causing a system to execute any of the disclosed methods can be stored on, for example, a computer-readable recording medium (CRMM), a signal-bearing medium, or the like. Non-limiting examples of signal-bearing media include a recordable type medium such as any form of flash memory, magnetic tape, floppy disk, a hard disk drive, a Compact Disc (CD), a Digital Video Disk (DVD), Blu-Ray Disc, a digital tape, a computer memory, or the like, as well as transmission type medium such as a digital and/or an analog communication medium (e.g., a fiber optic cable, a waveguide, a wired communications link, a wireless communication link (e.g., transmitter, receiver, transceiver, transmission logic, reception logic, etc.). Further non-limiting examples of signal-bearing media include, but are not limited to, DVD-ROM, DVD-RAM, DVD+RW, DVD-RW, DVD-R, DVD+R, CD-ROM, Super Audio CD, CD-R, CD+R, CD+RW, CD-RW, Video Compact Discs, Super Video Discs, flash memory, magnetic tape, magneto-optic disk, MINIDISC, non-volatile memory card, EEPROM, optical disk, optical storage, RAM, ROM, system memory, web server, or the like.

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result. Generally, the embodiments disclosed herein are non-limiting, and the inventors contemplate that other embodiments within the scope of this disclosure may include structures and functionalities from more than one specific embodiment shown in the figures and described in the specification. That is, one or more features of one or more embodiments may be combined to form another embodiment.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present disclosure may include references to directions, such as "vertical," "horizontal," "front," "rear," "left," "right," "top," and "bottom," etc. These references, and other similar references in the present disclosure, are only to assist in helping describe and understand the particular embodiment (such as when the embodiment is positioned for use) and are not intended to limit the present disclosure to these directions or locations.

The present disclosure may also reference quantities and numbers. Unless specifically stated, such quantities and numbers are not to be considered restrictive, but representative of the possible quantities or numbers associated with the present disclosure. Also in this regard, the present disclosure may use the term "plurality" to reference a quantity or number. In this regard, the term "plurality" is meant to be any number that is more than one, for example, two, three, four, five, etc. The term "about," "approximately," etc., means plus or minus 5% of the stated value. In the present disclosure, "based upon" means "based at least partially upon" unless stated otherwise. The term "substantially continuously" includes the meaning of "continuous" and "continual" unless stated otherwise. The term "determine" means "compute," "calculate," "identify," "measure," and/or "sense."

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The invention claimed is:

1. An event recognition system comprising:
one or more processing circuits including one or more memory devices and one or more processors, the one or more memory devices configured to store instructions thereon that, when executed by the one or more processors, cause the one or more processors to:
execute an algorithm that receives image data as an input and recognizes a first equipment object and a second equipment object in the image data;
recognize an event involving the first equipment object and the second equipment object based upon the image data containing the recognized first equipment object and the recognized second equipment object; and
execute an event procedure based upon the event, wherein the event procedure includes controlling the first equipment object.

2. The event recognition system of claim 1, wherein the one or more memory devices are further configured to store instructions thereon that, when executed by the one or more processors, cause the one or more processors to transmit the image data to a network-based client based upon the event.

3. The event recognition system of claim 2, wherein controlling the first equipment object includes controlling the first equipment object via the network-based client.

4. The event recognition system of claim 1, further comprising a camera system configured to acquire the image data.

5. The event recognition system of claim 1, wherein the one or more processing circuits include at least one of (a) a first processing circuit of a first system remote from a location at which the event occurs or (b) a second processing circuit of a second system local to the location at which the event occurs.

6. The event recognition system of claim 1, wherein each of the first equipment object and the second equipment object is a passenger boarding bridge, a pre-conditioned air unit, a ground power unit, a ground support equipment, an aircraft, or a rotorcraft.

7. The event recognition system of claim 1, wherein controlling the first equipment object includes at least one of braking, steering, or moving the first equipment object.

8. The event recognition system of claim 7, wherein the first equipment object is a ground support equipment or a passenger boarding bridge.

9. The event recognition system of claim 1, wherein controlling the first equipment object includes activating an alarm of the first equipment object.

10. The event recognition system of claim 9, wherein the first equipment object is an aircraft, a rotorcraft, or a ground support equipment.

11. The event recognition system of claim 1, wherein controlling the first equipment object includes activating the first equipment object.

12. The event recognition system of claim 11, wherein the first equipment object includes at least one of a pre-conditioned air unit or a ground power unit.

13. The event recognition system of claim 1, wherein the image data includes first image data of a first perspective of the second equipment object captured with a first camera and second image data of a second perspective of the second equipment object captured with a second camera.

14. The event recognition system of claim 1, wherein recognizing the event includes recognizing an identity of at least one of the first equipment object or the second equipment object in the image data.

15. The event recognition system of claim 1, wherein the event procedure includes at least one of (a) capturing additional image data with a camera, (b) instructing the camera to follow a pre-defined path, (c) manipulating an industrial device, (d) manipulating an electronic device, (e) manipulating a physical gateway, (f) activating an alarm, or (g) communicating with a remote system.

16. An event recognition system comprising:
one or more processing circuits including one or more memory devices and one or more processors, the one or more memory devices configured to store instructions thereon that, when executed by the one or more processors, cause the one or more processors to:
execute an algorithm that receives image data as an input and detects a first equipment object and a second equipment object in the image data;
recognize an event involving the first equipment object and the second equipment object based upon the image data containing the first equipment object and the second equipment object; and execute an event procedure based upon the event, wherein the event procedure includes at least one of (a) controlling the first equipment object or (b) transmitting the image data to a network-based client.

17. The event recognition system of claim 16, wherein at least one of (a) the event procedure includes transmitting the image data to the network-based client or (b) the network-based client facilitates controlling the first equipment object.

18. The event recognition system of claim 16, wherein the event procedure includes controlling the first equipment object.

19. An event recognition system comprising:

one or more processing circuits including one or more memory devices and one or more processors, the one or more memory devices configured to store instructions thereon that, when executed by the one or more processors, cause the one or more processors to:

acquire image data;

detect a first equipment object and a second equipment object in the image data;

recognize an event involving the first equipment object and the second equipment object from the image data; and execute an event procedure based upon the event, wherein the event procedure includes at least one of (a) controlling the first equipment object or (b) transmitting the image data to a network-based client.

20. The event recognition system of claim 19, wherein each of the first equipment object and the second equipment object is a passenger boarding bridge, a pre-conditioned air unit, a ground power unit, a ground support equipment, an aircraft, or a rotorcraft, wherein the event procedure include controlling the first equipment object, and wherein controlling the first equipment object includes at least one of (a) braking, steering, or moving the first equipment object, (b) activating an alarm of the first equipment object, or (c) activating the first equipment object.

* * * * *